(No Model.)

R. CANTELON
COTTON SEED DROPPER.

No. 255,593. Patented Mar. 28, 1882.

Witnesses:
A. M. Long
A. M. Tanner

Inventor.
Ramsford Cantelon
By Paine, Grafton and Ladd
Attorneys.

UNITED STATES PATENT OFFICE.

RAINSFORD CANTELON, OF EDGEFIELD, SOUTH CAROLINA.

COTTON-SEED DROPPER.

SPECIFICATION forming part of Letters Patent No. 255,593, dated March 28, 1882.

Application filed January 12, 1882. (No model.)

*To all whom it may concern:*

Be it known that I, RAINSFORD CANTELON, a citizen of the United States, residing at Edgefield, in the county of Edgefield and State of South Carolina, have invented certain new and useful Improvements in Cotton-Seed Droppers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a cotton-seed dropper of a novel construction specially adapted for dropping a proper quantity of seed at regular intervals.

The invention consists in the mechanism for dropping the seed, which comprises a vertically-operating plunger, a cut-off carried thereby, and a feed-shaft for conveying the seed into the discharge-opening in which the plunger operates, as will hereinafter be more fully described, and then set forth in the claims.

Figure 1:
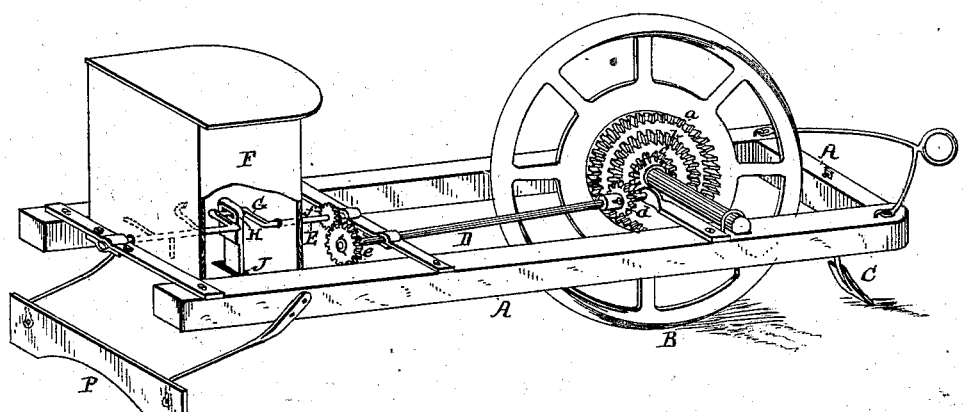
Figure 2:
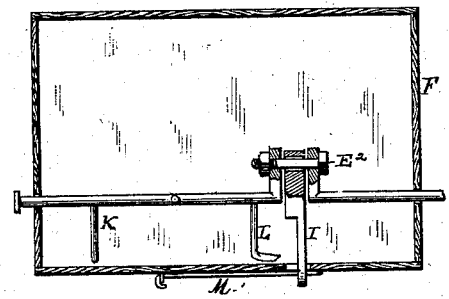
Figure 3:
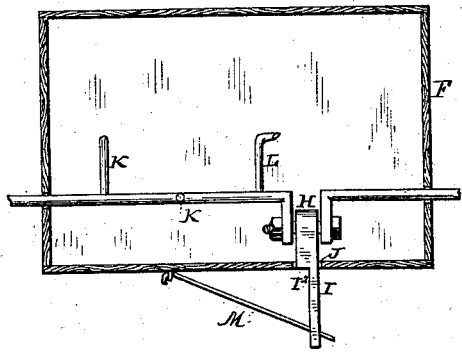
Figure 4:
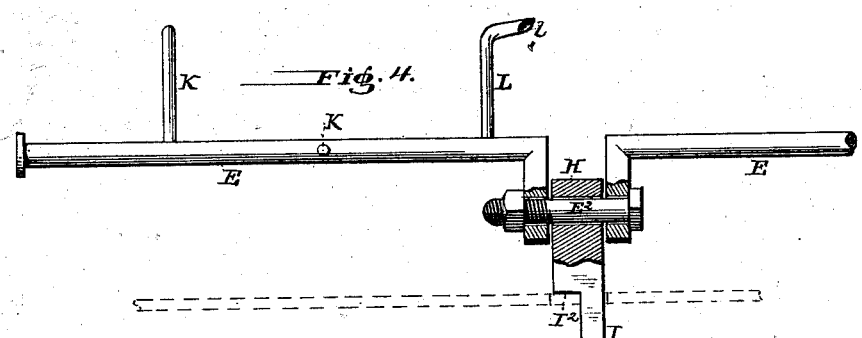

Figure 1 is a perspective view of a machine completely organized for dropping cotton-seed. Fig. 2 is a sectional view of the seed-hopper, showing the plunger in a raised position and the cut-off wire extending across the discharge-aperture. Fig. 3 is a sectional view of the seed-hopper, showing the plunger in the act of expelling the seed through the discharge-opening of the hopper. Fig. 4 is an enlarged view of the sectional crank-shaft, feeding-fingers, and plunger.

The letter A designates the frame of the planter, which is preferably constructed of two longitudinal beams connected at the front by a cross-beam, and also having other cross-bars for receiving and supporting the operating shafting and gearing.

A ground-wheel, B, arranged within the frame, is located directly in line with a colter or plow, C, which is fitted in the cross-beam of the frame, and is designed to open a proper furrow for the reception of the seed. The ground-wheel B has a beveled or V-shaped periphery, which travels in the furrow opened by the plow, and acts in the nature of a roller for forming a clean open furrow in which the seed can readily drop. The wheel B has on its side three cogged rims, $a\,b\,c$, into which meshes a pinion, $d$, carried by a longitudinal shaft, D, which is journaled in suitable cross-bars of the frame. The shaft D extends in a slightly-oblique direction from the wheel B to a second shaft, E, which is located exactly in line with the periphery of the wheel B. The two shafts are geared together by means of bevel spur-wheels $e\,f$. The shaft E extends through the seed hopper or box F, and is provided with a crank, G, which receives the slotted head or loop H of a vertically-reciprocating plunger, I, which is made larger at the top than at the bottom, so as to form a shoulder, $I^2$. The plunger operates through an aperture, J, in the bottom of the seed-hopper, and is designed for expelling the seed therefrom at regular intervals. The shaft E has several spirally-arranged fingers, K, which serve to convey the seed from the side of the hopper toward the discharge-aperture, and a finger, L, of a special construction, located in juxtaposition to said aperture, serves to feed the seed into the latter a few seeds at a time.

A cut-off, M, preferably made in the form of a wire, is pivoted to the bottom of the hopper, and its free end passes through an opening, $m$, in the plunger, so that it will rise and fall with said plunger for the purpose herein stated. The feed-finger is so disposed on the shaft E that when the plunger is in an elevated position it will sweep over the bottom of the hopper and push the seed into the opening. This feeding of the seed into the opening is insured by the obliquely-bent lower horizontal portion of the finger L, which has beveled end face, $l$, as is shown in Fig. 4.

The cut-off or wire M, connected with the hopper and plunger in the manner above described, will lie or extend across the discharge-opening, and prevent the passage of the seed therefrom until the revolution of the crank-shaft has carried the plunger in a downward direction, as is shown in Fig. 3. In this manner the seed is collected in the discharge-aperture and retained therein until it is expelled by the plunger, thus insuring the planting of the seed at regular distances apart.

A drag or covering board, P, is located in rear of the dropping devices, for covering the seed. The shaft E is in the present instance made in two parts and connected by a bolt, E², which forms part of the crank, as is shown in Fig. 4. The shaft, however, may be made in one piece and the crank and dropping devices located at any point within the hopper.

It will be manifest that the pinion $d$ is adjustable on its shaft, so that it can be thrown into gear with either one of the three toothed rims of the ground-wheel for regulating the discharge of seed from the hopper.

Having thus described my invention, what I claim as new, and desire to secure by Letters Patent, is—

1. In a cotton-seed dropper, the combination of the following elements, viz: a plunger or seed-expeller, a hopper having a discharge-aperture, a cut-off or wire carried by the plunger and pivoted to the hopper, and an arm or device for feeding the seed into the discharge-opening of the hopper, substantially as herein set forth.

2. The combination of the crank-shaft having spirally-arranged feed-fingers and a vertically-operating plunger with a hopper having an apertured bottom, as and for the purpose set forth.

3. The combination of the radial feed-finger having an obliquely-bent horizontal part provided with a beveled end face with the crank-shaft, the plunger, and the apertured hopper-bottom, as and for the purpose set forth.

In testimony whereof I affix my signature in presence of two witnesses.

RAINSFORD CANTELON.

Witnesses:
JAMES PAUL,
JOHN E. PAUL.